United States Patent [19]

Mohilef

[11] Patent Number: 5,149,550
[45] Date of Patent: Sep. 22, 1992

[54] METHODS FOR MAKING PET CHEWS

[75] Inventor: David M. Mohilef, Chatsworth, Calif.

[73] Assignee: Pet Center, Inc., Los Angeles, Calif.

[21] Appl. No.: 757,181

[22] Filed: Sep. 10, 1991

[51] Int. Cl.$^5$ .......................... A23K 1/10; A23K 1/18
[52] U.S. Cl. ........................................ 426/3; 426/456;
  426/417; 426/472; 426/480; 426/641; 426/805
[58] Field of Search .................. 426/3, 417, 466, 469,
  426/480, 472, 513, 641, 805, 456

[56] References Cited

U.S. PATENT DOCUMENTS

| | | | |
|---|---|---|---|
| 2,497,367 | 2/1950 | Notevarp | 426/472 |
| 3,123,047 | 3/1964 | Fisher . | |
| 3,368,528 | 2/1968 | Ganoe . | |
| 3,882,257 | 5/1975 | Cagle | 426/274 |
| 4,163,804 | 8/1979 | Meyer . | |
| 4,260,635 | 4/1981 | Fisher | 426/3 |
| 4,350,624 | 9/1982 | Herubel | 426/480 |
| 4,702,929 | 10/1987 | Lehn et al. | 426/805 |
| 4,880,642 | 11/1989 | Berends . | |
| 4,904,495 | 2/1990 | Spanier | 426/805 |
| 4,985,964 | 1/1991 | Lawson | 426/805 |
| 5,047,231 | 9/1991 | Spanier et al. | 426/805 |

OTHER PUBLICATIONS

Hawley "The Condensed Chemical Dictionary" 10th edition (1982) Van Nostrand Reihold Publishers p. 409.

Primary Examiner—R. B. Penland
Attorney, Agent, or Firm—McCubbrey, Bartels, Meyer & Ward

[57] ABSTRACT

The present invention provides methods for making pet chews. According to the invention, ligaments from cattle and other hoofstocks are rendered substantially free of fat and then dried until the de-fatted ligaments are hardened and suitable for use as pet chews. According to the invention, the ligaments are rendered substantially free of fat in one of two ways: (1) either by washing the ligaments in an aqueous degreasing solution comprised of water, strong alkali (e.g., sodium or potassium hydroxide) and cleaning agents or (2) by roasting the ligaments until they are rendered substantially free of adherent fat. With the aqueous degreasing method, the washed ligaments are roasted until they assume a pleasing color. Following roasting, the ligaments may be further dried until they are hard and "bone like", and suitable for pets to chew on.

18 Claims, No Drawings

METHODS FOR MAKING PET CHEWS

FIELD OF THE INVENTION

This invention relates to a method for making pet chews from roasted and dried hoofstock ligaments from which appendant fat and meat have been removed.

BACKGROUND OF THE INVENTION

Pet chews can be made by treating by-products from cattle and other animals to produce hardened substances which are good for pets to chew on. For example, "artificial bones" for pets to chew on can be made from rawhide. To make the pet chews the rawhide is treated and shaped so it mimics natural bone. Other pet chews are made by treating cattle skin or other skin parts and then grinding them into meal. With this method the skin meal is combined with an appropriate binder, and then the mixture is molded into a suitable shape. The molded shapes are subsequently subjected to pressure or a combination of pressure and heat so that products assume the shape of the mold and become a solid mass. Other chews for pets are made by cooking cattle tendons, removing any adhering meat and fat, and then baking the tendons until they are completely hardened.

Although the pet chew products described above are suitable for pets to chew on, the methods of making them are labor and energy intensive. It is desirable to cut these labor and energy costs so that the resulting pet chew products can be produced more economically. It is an object of the present invention to provide new methods for manufacturing pet chews. The new methods should not require that the animal by-products be ground and mixed with a binder before the substances can be brought into a form and size suitable for use as a pet chew product. It is another object of the invention to avoid the need to cook the animal by-products in order to remove the appendant fat and meat and render the by-products suitable for use as pet chews.

SUMMARY OF THE INVENTION

The present invention provides methods for making pet chews. According to the invention, ligaments from cattle and other hoofstocks are rendered substantially free of fat and then roasted and dried until the de-fatted ligaments are hardened and suitable for use as pet chews. According to the invention, the ligaments are rendered substantially free of fat in one of two ways: (1) either by washing the ligaments in an aqueous degreasing solution comprised of water, strong alkali (e.g., sodium or potassium hydroxide) and cleaning agents or (2) by roasting the ligaments until they are rendered substantially free of adherent fat.

According to the aqueous degreasing method of the invention, the ligaments are washed in an aqueous degreasing solution comprised of water, strong alkali (e.g., sodium or potassium hydroxide) and cleaning agents for an amount of time sufficient to substantially remove adherent fat from the ligaments. After being washed, any adherent meat is manually or mechanically removed. The washed ligaments are then roasted until the ligaments turn a desired color, e.g., a golden honey color or a light brown color. The roasted and de-fatted ligaments are further dried if necessary until they are hardened or substantially hardened. In this de-fatted and dried form, the ligaments are "bone like" and suitable as pet chews.

According to the roasting method of the invention, the ligaments are roasted for an amount of time sufficient to substantially remove adherent fat from the ligaments. The roasting is preferably done in a convection type over with air circulating around the ligaments as they are being roasted. In this manner, in a single step, the ligaments are rendered substantially free of adherent fat, assume a desired color, and are partially dried. After being roasted, the de-fatted and partially dried ligaments are further dried until they are hardened or substantially hardened. After hardening, if there is any adhering fat that was "baked-on" during the roasting step, it can be manually or mechanically removed.

The aqueous alkaline degreasing method of the invention is especially useful for preparing large industrial quantities or pet chews; the roasting method is preferable if suitable ovens and grease catching means are available, and/or if smaller batches of ligaments are to be prepared.

DETAILED DESCRIPTION OF THE INVENTION

The present invention provides methods for making pet chews. The invention is based on the discovery that it is possible to remove appendant fat from animal ligaments without pre-cooking them in an aqueous solution. According to the teaching of the invention, the appendant fat can be removed from animal ligaments in one of two ways: (1) either by washing the ligaments in an aqueous degreasing solution comprises of water, strong alkali (e.g., sodium or potassium hydroxide) and cleaning agents or (2) by roasting the ligaments until they are rendered substantially free of adherent fat.

Prior art methods for making pet chews, such as those disclosed in U.S. Pat. No. 4,880,642 which issued Nov. 14, 1989 to Jos Berends for "Method of Making Chewing Bones for Pets", remove fat from sinews or tendons by "cooking" the tendons in an aqueous broth. This treatment is both labor and energy intensive since it involves boiling or steaming the tendons at temperatures of higher than 90° C. for about 4 to 6 hours until the meat is cooked and the sheaths become soft. The insight of the present invention, i.e., use of an aqueous alkaline degreasing solution or roasting to substantially remove appendant fat from the ligaments, makes it possible to eliminate the labor and energy intensive step of "cooking" the tendons to remove appendant fat. Elimination of the "cooking" step allows the final pet chews products to be produced faster and at less cost.

According to the present invention, ligaments (including tendons, sinews and the like, hereinafter collectively referred to as ligaments) from cattle and other hoofstocks (e.g., buffalo, swine, sheep, cows, bulls, oxen, horses, and ponies, hereinafter collectively referred to as hoofstocks) are obtained form butchers or slaughter houses, or from other suitable sources. The ligaments and tendons are "dressed" to remove as much fat and meat as possible. The ligaments will contain some adhering meat and fat because it is not practical or necessary to manually or mechanically remove the adhering fat and meat particles. The dressed ligaments are then subjected to either aqueous alkaline degreasing or roasting to remove adherent fat completely or substantially completely.

Turning first to use of the aqueous alkaline degreasing method for removing appendant fat from the ligaments, this aspect of the invention comprises subjecting the ligaments to an aqueous degreasing solution comprised of water, strong alkali such as sodium or potassium hydroxide, or the like, and cleaning agents, e.g., surfactant(s), wetting agents, detergents, chelating agents, phosphates, carbonates, sulfates, suds regulating agents, water softening agents, and the like. Sodium hydroxide (i.e., caustic soda) is a preferred alkali for use in the aqueous alkaline degreasing method of the present invention because it is readily available, and cost effective. Sodium hydroxide, in combination with surfactants, wetting agents, detergents, chelating agents, phosphates, and the like, is available commercially in the form of "cleaning" compounds, which are marketed under various tradenames and trademarks. A preferred commercially available sodium hydroxide based "cleaner" is marketed by Morgan-Gallacher, Inc., 4628 Cecella Street, Cudahy, Calif. 90201 under the trademark "B BRITE 2 TM". (B BRITE 2 TM is composed of about 80% sodium hydroxide, with the remaining 20% being a combination of chelating agents, surfactants and complex phosphates.) Alternatively, the caustic soda can be mixed with commercially available "cleaning agents". The composition of the cleaning agents per se is not critical to the invention as long as the cleaning agents contain surface active agents which aid wetting, and having dispersing and cleaning properties which will help "wash away" the fat and the like which is "dissolved" by the strong alkali. Combinations of suitable cleaning agents are widely available under a variety of brand names. Because they are low foaming, combinations of cleaning agents sold for use in dishwashers are especially suitable for use in the method of the invention. Preferred combinations of alkali and cleaning agent(s) consist of about 10-90% strong alkali and about 90-10% cleaning agent(s). Especially preferred is a combination consisting of about 80% strong alkali and about 20% cleaning agent(s).

According to the aqueous alkaline degreasing aspect of the invention, ligaments which have been dressed to remove most adhering meant and fat are subjected to an aqueous degreasing solution comprised of water, strong alkali (e.g., sodium hydroxide) and cleaning agent(s). Preferably the pH of the aqueous degreasing solution is about 11-14, most preferably about 12-13.5; preferably the temperature of the solution is about 95°-105° F. To remove appendant fat the ligaments are subjected to the warm aqueous degreasing solution for an amount of time sufficient to allow the degreasing solution to remove substantially all of the appendant fat. In a solution comprised of about 80% sodium hydroxide and about 20% cleaning agents, at a pH of about 13 and a temperature of about 100° F. substantially all appendant fat is removed from the ligaments in about 15-20 min. (If lower temperatures are used, the ligaments have to be subjected to the alkaline degreasing solution for longer periods.) If desired, the aqueous degreasing solution containing the ligaments may be agitated or stirred.

In preferred form, the ligaments are placed in an industrial "tripe" washer containing warm water (e.g., about 100° F.). Suitable amounts of a strong alkali, such as sodium hydroxide, and cleaning agents, e.g., surfactant(s), wetting agents, detergents, chelating agents, phosphates, carbonates, sulfates, suds regulating agents, water softening agents, and the like, are added to bring the pH of the water solution to about pH 13. The ligaments are then "washed"(with agitation or tumbling) with the aqueous degreasing solution. The "washing" time will vary depending on the temperature of the solution and the thickness of the fatty tissue portions that adhere to the ligaments. On average, at a temperature of about 100° F., the washing cycle will take approximately 15-20 minutes.

After being washed with aqueous degreasing solution, the ligaments are rinsed with fresh water rinses for an amount of time sufficient to remove or substantially remove the alkali and cleaning agents from the ligaments. If is possible to determine that substantially all the alkali and cleaning agents have been removed by testing the pH of the rinse water. When the pH of the rinse water is about neutral (i.e., about pH 7), it is known that substantially all of the alkali and cleaning agents have been removed from the ligaments.

After rinsing, the ligaments are strained or spun dry. If there is any meat still adhering to the ligaments, it is removed manually or mechanically. If desired, the degreased and washed ligaments may be cut into pieces, tied, twisted, or shaped in any manner desired. The washed and degreased ligaments are then roasted at temperatures of about 275°-325° F. for about 3-4 hours, or until the ligaments have turned a honey or light brown color. If necessary the washed and roasted ligaments are further dried until they have hardened completely or substantially completely and are "bone like". To hasten the time it takes for the ligaments to harden, drying is done in a drying room (heated to about 140°-150° F.), preferably with air circulating. In the warm drying room, drying is accomplished in about 48 to about 72 hours.

According to the roasting aspect of the invention, the starting ligaments and tendons are also "dressed" to remove as much fat and meat as possible. The dressed ligaments are then roasted in an oven until most of the adherent fat liquefies and falls off and away from the ligaments. Preferably the ligaments are roasted until; they turn a honey or light brown color, e.g., in an oven set at about 275°14 325° F. for about 3-4 hours. Most preferably the roasting is one in a convection type oven so that air circulates in and around the ligaments.

Following this roasting step the de-fatted ligaments are dried until the ligaments have hardened completely or substantially completely and are "bone like". Again, in preferred form, the drying is again done in a drying room, preferably with air circulating, at temperatures of about 140°-150° F. Again, in preferred form, the drying is again done in a drying room, preferably with air circulating, at temperatures of about 140°-150° F. Once the ligaments are substantially hardened, any dried adherent fat may be manually or mechanically removed. Once the ligaments are substantially hardened, any dried adherent fat may be manually or mechanically removed. Suitable mechanical means for removing any remaining adherent fat are scraping, grinding, sanding, buffing etc.

The following examples are presented for purposes of illustration and not of limitation.

EXAMPLE 1

A batch of about 750 lbs of cattle ligaments (which had been dressed to remove as much adherent meat and fat as possible) were placed in an industrial "tripe" washer tank having a capacity of about 160 gallons. The tank contained about 160 gallons of warm water (about 100° F.) to which about 15 lbs. of a sodium hydroxide based cleanser (B BRITE 2 TM) had been added. The pH of the water solution before the alkaline cleanser was added was pH 7; after the B BRITE 2 TM was added the pH was about 13.1. After the ligaments were added to the warm aqueous alkaline solution (pH 13.1), the ligaments were washed with agitation or tumbling for about 15 minutes. The ligaments were then rinsed in fresh water two times, with each rinse cycle being approximately 15 minutes. The final rinse water had a pH of about 7. Following the fresh water rinses the ligaments were spun dry in the "tripe" washer. After being spun dry, any adherent meat was removed from the ligaments. The ligaments were cut into pieces and roasted in a convection oven. The oven was set at about 300° F., and the ligaments were left in the oven for about 3.5 hours. After that time the ligaments had assumed a pleasing light honey color. The ligaments were further dried in a drying room at temperatures of about 140°-150° F. for about 48 hours, after which time the ligaments were substantially completely hardened.

EXAMPLE 2

A batch of about 750 lbs of cattle ligaments (which had been dressed to removed as much adherent meat and fat as possible) were placed in an industrial "tripe" washer tank having a capacity of about 160 gallons. The tank contained about 160 gallons of arm water (about 100° F.) to which about 12 lbs. caustic soda (sodium hydroxide) and 3 lbs. of granular dish washer soap (Cascade TM brand) had been added. The pH of the water solution before the soda-soap combination was added was pH 7; after the caustic soda and dishwasher soap were added the pH was about 13. After the ligaments were added to warm aqueous alkaline solution (pH 13), the ligaments were washed with tumbling for about 15 minutes. The ligaments were then rinsed in fresh water two times, with each rinse cycle being approximately 15 minutes. The final rinse water had a pH of about 7. Following the fresh water rinses the ligaments were spun dry in the "tripe" washer. After being spun dry, adherent meat was removed from the ligaments. The ligaments were cut into pieces and roasted in a convection oven. The oven was set at about 30020 F., and the ligaments were left in the oven for about 3.5 hours. After that time the ligaments had assumed a desired honey color. Those ligaments that were not were substantially completely hardened were further dried in a drying room at temperatures of about 140°-150° F. for about 50 hours or until the ligaments were substantially completely hardened and "bone like".

EXAMPLE 3

A batch of about 50 lbs of cattle ligaments (which had been dressed to remove as much adherent fat and meat as possible) were placed in a convection oven. The oven was set at about 325° F. and the ligaments were roasted for about 3 hours, by which time most of the adherent fat had liquified and had fallen off and away from the ligaments. Following the roasting step, the ligaments had assumed a pleasing honey color.

Following this roasting step the de-fatted ligaments were dried until the ligaments had hardened completely or substantially completely and were "bone like". The drying was done in a drying room with air circulating, at a temperature of about 140°-150° F. Once the ligaments were substantially hardened, any dried adherent fat was mechanically removed by grinding and buffing.

CONCLUSION

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A method for making pet chews consisting essentially of:
   (a) removing adherent fat from hoofstock ligaments by washing said ligaments in an aqueous degreasing solution comprised of water, strong alkali and cleaning agents(s) for an amount of time sufficient to substantially remove adherent fat from said ligaments,
   (b) roasting the de-fatted ligaments from step (a) until said ligaments assume a desired color,
   (c) drying said ligaments from step (b) until said ligaments are hardened or substantially hardened.

2. A method according to claim 1 wherein said strong alkali is sodium hydroxide or potassium hydroxide.

3. A method according to claim 1 wherein said cleaning agents are selected from the group consisting of surfactant(s), wetting agents, detergents, chelating agents, phosphates, carbonates, sulfates, suds regulating agents and water softening agents.

4. A method according to claim 1 wherein said cleaning agent(s) are low foaming.

5. A method according to claim 1 wherein said aqueous degreasing solution is comprised of about 10% to about 90% strong alkali and about 90% to about 10% cleaning agent(s).

6. A method according to claim 1 wherein said aqueous degreasing solution is comprised of about 60% to about 90% strong alkali and about 40% to about 10% cleaning agents(s).

7. A method according to claim 1 wherein said aqueous degreasing solution is comprised of about 80% strong alkali and about 20% cleaning agent(s).

8. A method according to claim 1 wherein said aqueous degreasing solution has a pH of about 11 to about 14.

9. A method according to claim 1 wherein said aqueous degreasing solution has a pH of about 13.

10. A method according to claim 1 wherein said aqueous degreasing solution has a temperature of about 95°-105° F.

11. A method according to claim 1 wherein said ligaments are washed in said aqueous degreasing solution for about 15 to about 20 minutes when the pH of said solution is about pH 13 and the temperature of said solution is about 95° F. to about 105° F.

12. A method according to claim 1(a) wherein said washed ligaments are rinsed in fresh water for an amount of time sufficient to remove said alkali and said cleaning agent(s) from said ligaments prior to roasting in step (b).

13. A method according to claim 1 wherein said ligaments are roasted at about 275° F. to about 325° F. for about 3 to about 4 hours.

14. A method for of making pet chews consisting essentially of:
   (a) removing adherent fat from hoofstock ligaments by roasting said ligaments in an oven until most of the adherent fat liquefies and falls off and away from said ligaments,
(b) drying the de-fatted ligaments from step (a) until the ligaments are hardened or substantially hardened,
(c) substantially removing any fat remaining on said ligaments by suitable manually or mechanical means.

15. A method according to claim 14 wherein said ligaments are roasted at about 275° F. to about 325° F. for about 3 to about 4 hours.

16. A method according to any of claims 2-13 further comprising shaping said ligaments into desired shapes.

17. A method according to any of claims 2-13 wherein said washed or roasted ligaments are dried in a drying room for about 48 to about 72 hours wherein said drying room has circulating air and temperatures of about 140° F. to about 150° F.

18. A method according to any of claims 2-13 wherein said ligaments are obtained from hoofstocks selected from the group consisting of cattle, buffalo, swine, sheep, bulls, oxen, horses and ponies.

* * * * *

UNITED STATES PATENT AND TRADEMARK OFFICE
CERTIFICATE OF CORRECTION

PATENT NO. : 5,149,550
DATED : September 22, 1992
INVENTOR(S) : David M. Mohilef It is certified that error appears in the above-identified patent and that said Letters Patent is hereby corrected as shown below:

Column 2, line 19, delete "or" and insert therefor --of--.

Column 2, line 59, delete "form" and insert therefor --from--.

Column 3, line 43, delete "meant" and insert therefor --meat--.

Column 4, line 42, delete "one" and insert therefor --done--.

Column 5, line 27, delete "arm" and insert therefor --warm--.

Column 5, line 44, delete "30020 F." and insert therefor --300°F--.

Signed and Sealed this

Ninth Day of November, 1993

*Attest:*

*Attesting Officer*

BRUCE LEHMAN

Commissioner of Patents and Trademarks